(12) United States Patent
Smith et al.

(10) Patent No.: US 11,161,761 B2
(45) Date of Patent: Nov. 2, 2021

(54) METHOD FOR TREATING WASTEWATER USING A PORTABLE, NON-BIOLOGICAL, CYCLIC SEWAGE TREATMENT PLANT

(71) Applicants: Daniel R. Smith, Springtown, TX (US); Kenneth A. Roberson, Jr., Austin, TX (US)

(72) Inventors: Daniel R. Smith, Springtown, TX (US); Kenneth A. Roberson, Jr., Austin, TX (US)

( * ) Notice: Subject to any disclaimer, the term of this patent is extended or adjusted under 35 U.S.C. 154(b) by 0 days.

(21) Appl. No.: 16/283,747

(22) Filed: Feb. 23, 2019

(65) Prior Publication Data

US 2019/0185359 A1 Jun. 20, 2019

Related U.S. Application Data

(62) Division of application No. 14/775,695, filed as application No. PCT/US2014/030016 on Mar. 15, 2014, now Pat. No. 10,710,916.

(Continued)

(51) Int. Cl.
*C02F 9/00* (2006.01)
*C05F 7/00* (2006.01)
(Continued)

(52) U.S. Cl.
CPC .............. *C02F 9/00* (2013.01); *C02F 1/001* (2013.01); *C05F 7/00* (2013.01); *C02F 1/004* (2013.01); *C02F 1/283* (2013.01); *C02F 1/32* (2013.01); *C02F 1/50* (2013.01); *C02F 1/5245* (2013.01); *C02F 1/5281* (2013.01); *C02F 1/56* (2013.01); *C02F 1/66* (2013.01); *C02F 1/76* (2013.01); *C02F 1/78* (2013.01); *C02F 11/122* (2013.01); *C02F 2001/007* (2013.01);
(Continued)

(58) Field of Classification Search
CPC ........................................................ C02F 9/00
See application file for complete search history.

(56) References Cited

U.S. PATENT DOCUMENTS 4,340,489 A * 7/1982 Adams ...................... C02F 1/72
210/718
4,482,459 A * 11/1984 Shiver .................... B01D 36/00
210/639

(Continued)

*Primary Examiner* — Peter Keyworth
(74) *Attorney, Agent, or Firm* — Guy V. Manning

(57) ABSTRACT

A mobile sewage treatment and water reclamation system for rapid deployment to augment existing wastewater systems and/or provide interim service in lieu of permanent facilities, includes: (a) a denaturing stage wherein raw sewage is first ground into suspendable grit, its pH lowered to kill acid-sensitive bio-organisms and raised to kill base-sensitive bio-organisms, and then neutralized; (b) a clarifying stage employing an inverted-cone tank to circulate the solution after injection with chemicals to flocculate small particles for collection in a layer for siphoning off; and (c) a disposal stage wherein clarified water passes through media filters to remove remaining solids and odors, the effluent water being clean enough for irrigation, aquatic life and discharge into waterways; and wherein sterile sludge is pressed into semi-dry solids, then dried, crushed, powdered and bagged for use as high-nitrate biomass fertilizer or for fossil-fuel power co-generation applications.

12 Claims, 13 Drawing Sheets

Related U.S. Application Data

(60) Provisional application No. 61/799,432, filed on Mar. 15, 2013.

(51) Int. Cl.
*C02F 1/00* (2006.01)
*C02F 1/28* (2006.01)
*C02F 1/66* (2006.01)
*C02F 1/32* (2006.01)
*C02F 1/76* (2006.01)
*C02F 1/78* (2006.01)
*C02F 11/122* (2019.01)
*C10L 5/46* (2006.01)
*C02F 1/56* (2006.01)
*C02F 1/50* (2006.01)
*C02F 1/52* (2006.01)

(52) U.S. Cl.
CPC .. *C02F 2201/007* (2013.01); *C02F 2201/008* (2013.01); *C02F 2209/003* (2013.01); *C02F 2209/26* (2013.01); *C02F 2301/026* (2013.01); *C02F 2301/046* (2013.01); *C02F 2301/08* (2013.01); *C02F 2303/02* (2013.01); *C02F 2303/04* (2013.01); *C02F 2303/18* (2013.01); *C02F 2303/22* (2013.01); *C02F 2303/24* (2013.01); *C02F 2303/26* (2013.01); *C02F 2305/04* (2013.01); *C10L 5/46* (2013.01); *Y02A 40/20* (2018.01)

(56) References Cited

U.S. PATENT DOCUMENTS

| | | | |
|---|---|---|---|
| 2005/0051488 A1* | 3/2005 | Nagghappan | B01D 61/12 210/652 |
| 2009/0107924 A1* | 4/2009 | Kigel | C02F 3/12 210/758 |
| 2009/0145846 A1* | 6/2009 | Burns | B01J 8/0025 210/661 |

* cited by examiner

METHOD FOR TREATING WASTEWATER USING A PORTABLE, NON-BIOLOGICAL, CYCLIC SEWAGE TREATMENT PLANT

CROSS REFERENCE TO RELATED APPLICATION

This application is a Divisional Application of and claims the benefit of priority from U.S. patent application Ser. No. 14/775,695, filed Sep. 12, 2015, as National Phase entry into the U.S. patent system from International Application No. PCT/US14/30016, filed Mar. 15, 2014, which itself claims the benefit of priority from U.S. Provisional Application Ser. No. 61/799,432, filed Mar. 15, 2013, each of the foregoing being entitled PORTABLE, NON-BIOLOGICAL, CYCLIC SEWAGE TREATMENT PLANT. The contents of each of the foregoing applications is incorporated by reference herein in their entirety.

BACKGROUND OF THE INVENTION

1. Field of the Invention

This invention relates generally to municipal sewage treatment facilities and methods, and particularly to a sewage plant adapted for short-term service at temporary locations to mitigate interim short-falls of sewage treatment capacity. More particularly, this invention relates to a portable, unitary, non-biological sewage treatment system adapted to be moved without disassembly on national and state highways between temporary sites, and the apparatus and methods employed to make such sewage treatment facilities portable.

2. Description of Related Art

The majority of wastewater treatment plants in use today for treatment of municipal sewage are of the biological type. It is well known that the liquid waste from such plants is not suitable for re-use without advanced or tertiary treatment which requires additional equipment and land space. The solid waste also requires considerable handling and space, either for disposal or processing for re-use as fertilizer or fuel. Land requirements and equipment size for such plants thus are quite large, resulting in significant capital investment when building or expanding this type of plant. A need exists for a compact, unitary, portable wastewater treatment plant that does not require extensive pretreatment or materials handling space.

It is widely known that sulfur dioxide is an effective and rapid disinfecting agent for both liquids and solids, and it is an economically acceptable choice. Previous designs for chemical disinfection and dewatering systems have failed to gain wide acceptance, mostly due to insufficient reduction in equipment size, or limitations imposed by systems designed for batch operation. There exists a need for a Wastewater Treatment System that will continuously disinfect both the liquid and the solids in a rapid manner in limited space.

Temporary construction sites can develop very large camps occupied by workers and sometimes their families for months and even years at a time. Often located in remote, rural settings or near small, existing settlements, sewage treatment requirements of such camps can easily overwhelm local treatment capacity, if it exists at all. This could require such municipalities to add far more capacity than they'll need once the camp is disbanded after construction. A need exists for temporary wastewater treatment facilities that easily can be set up for interim capacity increases and efficiently and quickly removed and relocated when no longer needed. Further, a need exists for a sewage treatment plant that can be moved on national and local roadways from one such site to the other with little or no disassembly.

SUMMARY OF THE INVENTION

A mobile sewage treatment and water reclamation system for rapid deployment to augment existing wastewater systems and/or provide interim service in lieu of permanent facilities, includes: (a) a denaturing stage wherein raw sewage is first ground into suspendable grit, its pH first lowered to kill acid-sensitive bio-organisms, then raised to kill base-sensitive bio-organisms, and then neutralized; (b) a clarifying stage employing an inverted-cone tank to circulate the solution after injection with chemicals to flocculate small particles for collection in a layer for siphoning off; and (c) a disposal stage wherein clarified water passes through media filters to remove remaining solids and odors, the effluent water being clean enough for irrigation, aquatic life and discharge into waterways; and wherein sterile sludge is pressed into semi-dry solids, then dried, crushed, powdered and bagged for use as high-nitrate biomass fertilizer or for fossil-fuel power co-generation applications.

BRIEF DESCRIPTION OF THE DRAWINGS

The novel features believed characteristic of the present invention may be set forth in appended claims. The invention itself, however, as well as a preferred mode of use and further objects and advantages thereof, will best be understood by reference to the following detailed description of an illustrative embodiment when read in conjunction with the accompanying drawings, wherein:

DESCRIPTION OF A PREFERRED EMBODIMENT

Referring now to the figures, and particularly to FIGS. 1-7, the portable wastewater treatment system of the present invention comprises both method and apparatus adapted to provide a portable, unitary, rapidly deployable system on two trailers which can be set up for providing sewage and wastewater treatment on a temporary or permanent basis. The system first will be discussed as a method, or process, and then a discussion follows of the physical layout which enables quick deployment and mobility.

Process

The method employed by the present invention comprises chemically treating wastewater first with an acid such as sulfur dioxide ($SO_2$), and then with an alkaline such as lime (calcium hydroxide ($Ca(OH)_2$), to disinfect the liquid and solids of both high and low pH tolerant organisms, then neutralizing the pH of the resulting fluid and processing it to precipitate and separate solids from liquid water, both of which then can be returned to the environment.

Figure 1:
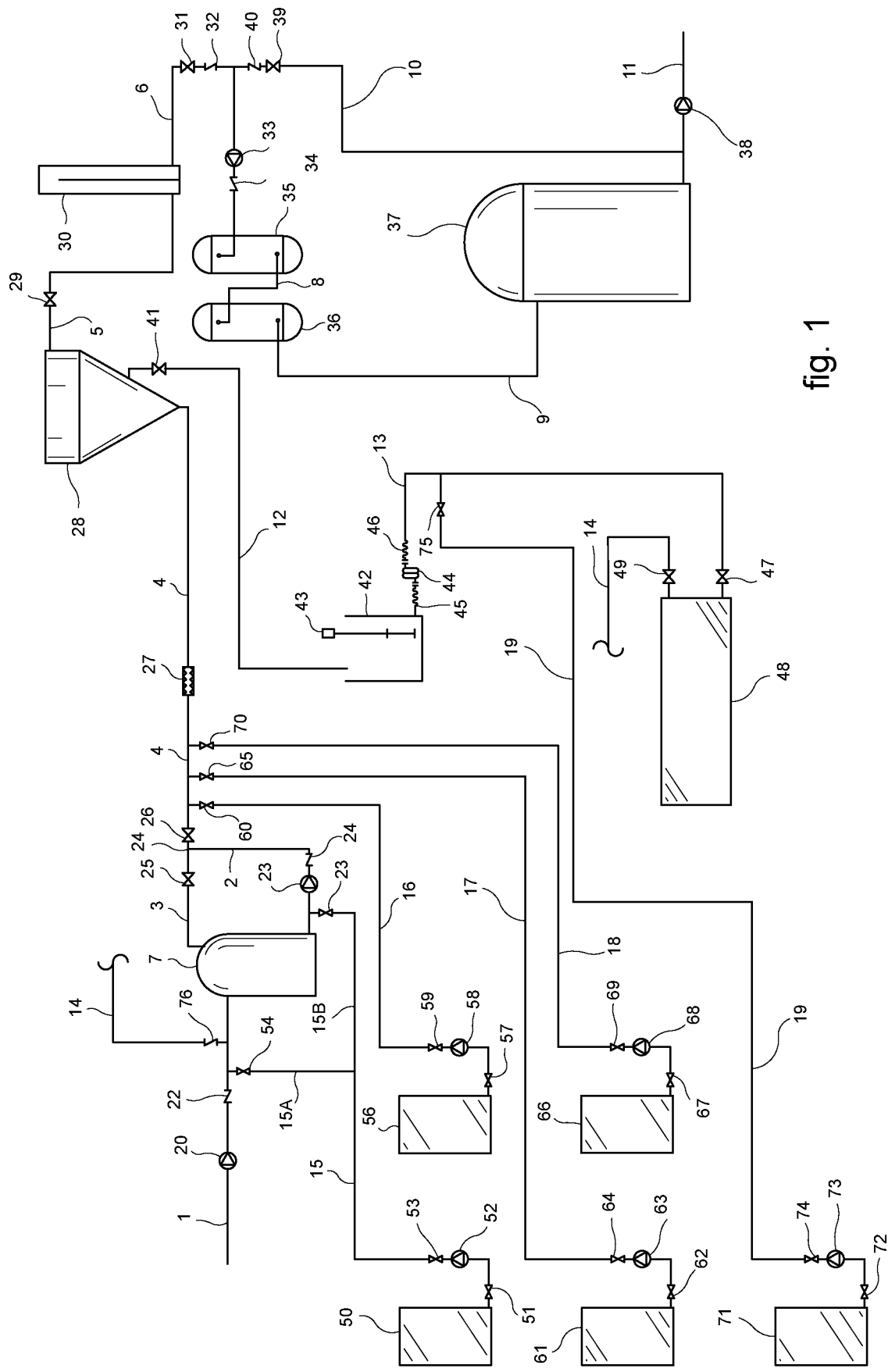
FIG. 1 shows a schematic of the wastewater treatment system of the present invention.
Figure 3:
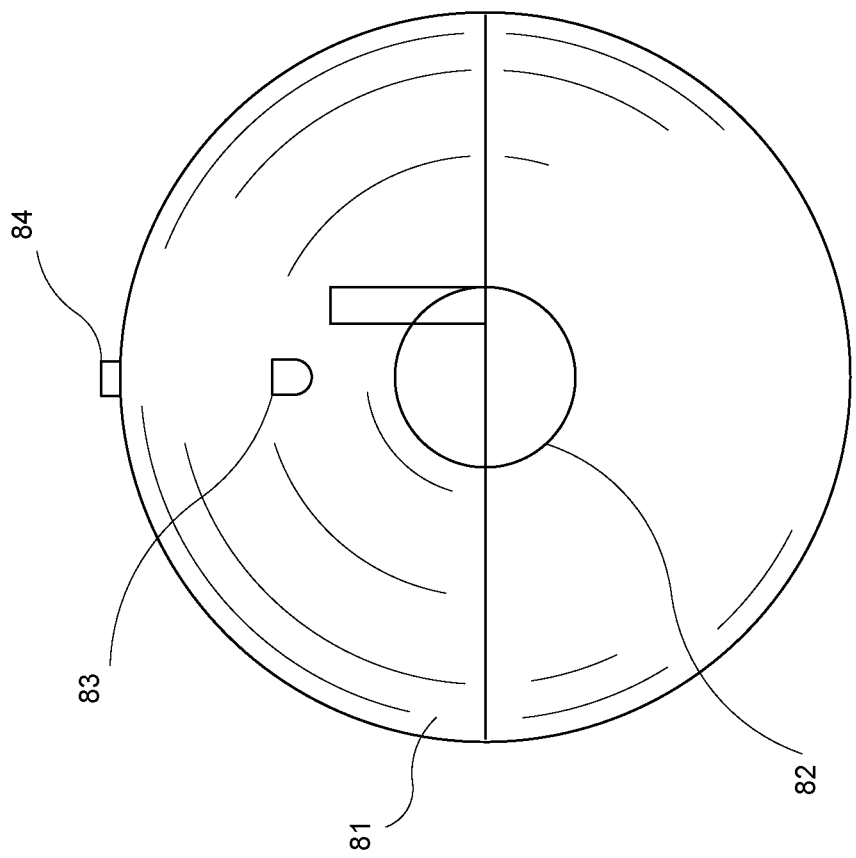
FIG. 3 shows a bottom plan view of the reaction vessel of FIG. 2.
Figure 2:
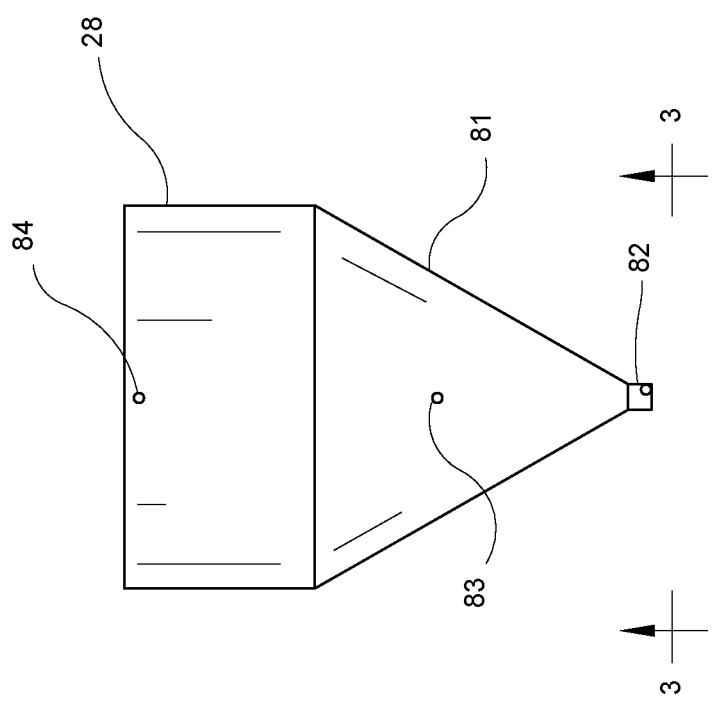
FIG. 2 details the reaction vessel of the wastewater treatment system of FIG. 1.

FIG. 1 is a schematic representation of the process. Raw wastewater is introduced into the system via conduit 1 where it enters a macerating stage, represented in FIG. 1 by macerating pump 20, which reduces suspended solids in the wastewater to a size range of 30-200 microns. In a preferred embodiment discussed in detail below, separate pretreatment stage 130 buffers influent wastewater flow and feeds it steadily into the treatment system at conduit 1. Pretreatment stage 130 includes screens (not shown) for straining out large, solid objects and a macerating system 20A that reduces remaining solids to the ranges specified above. One having ordinary skill in the art will recognize that various means for processing raw sewage into satisfactory influent waste water for feeding into the system at conduit 1 may be employed without departing from the spirit and scope of the present invention.

Pretreated wastewater flows into the system through check valve 22 and proceeds directly into influent surge tank 7, where it is partially disinfected. Just upstream of influent surge tank 7, the wastewater is injected with a acid such as sulfur dioxide ($SO_2$) which lowers its pH to kill acid-intolerant microorganisms. Preferably, the acid is injected in an amount sufficient to reduce the pH of the wastewater to between 2 and 2.5, resulting in a residual sulfur dioxide content of at least 20 ppm up to 100 ppm, preferably around 75 ppm.

One having ordinary skill in the art will recognize that other inorganic acids, such as compounds of bromine and chlorine, halogen compounds, chloramines and ozone can serve the purpose of lowering the pH of influent wastewater. Likewise, the wastewater can be treated with ultraviolet light equipment, though UV disinfecting with current technology is quite expensive. Sulphur dioxide thus is preferred, because it is plentiful, inexpensive, comparatively safe to handle, non-carcinogenic and easily can be provided in a variety of ways, depending upon the preference of operators of the system.

Acid Injection System

Liquid sulfurous acid ($H_2SO_3$), when mixed with water, ionizes into sulfur dioxide and water. A preferred embodiment of the acid injection system would include on-board storage tank 50 containing liquid sulfurous acid which, when fed by chemical forwarding pump 52 through feed conduits 15, 15A, 15B, is injected directly into the stream of wastewater both upstream (through chemical feed valve 54) and downstream (through chemical feed valve 55) of influent surge tank 7. This arrangement allows an operator (not shown) to select a desired sulfur dioxide injection point based on system operation and the nature of the influent wastewater.

An alternate embodiment for the sulfur dioxide injection system comprises using gaseous sulfur dioxide in commercial cylinders. These replace chemical storage tank 50, chemical storage tank valve 51, and chemical pump 52 with a gas cylinder and injection valve (neither shown), flowing through the remaining chemical feed conduits 15, 15A, 15B, and chemical feed valves 54, 55 for the on-board chemical storage tank arrangement discussed above.

Another alternate embodiment for the sulfur dioxide injection system comprises a sulfur dioxide generator (not shown) installed downstream of influent check valve 22, so that the influent wastewater flows through a chamber in the presence of burning sulfur and oxygen, thereby absorbing the necessary sulfur dioxide produced in the combustion process. In this arrangement, chemical storage tank 50, chemical storage tank valve 51, chemical feed pump 52, chemical feed valve 53, chemical feed conduits 15, 15A, 15B and chemical feed valves 54, 55 could be eliminated.

After spending less than two (2) minutes in the low-pH disinfection step within influent surge tank 7, the wastewater exits surge tank 7 via exit conduit 2, urged by pressurizing pump 23 toward branch point 2A, where a first portion recycles back to influent surge tank 7 through recycle conduit 3. Recycling of a portion of the wastewater results in an average contact time of at least five (5) minutes with the acidic environment and allows the sulfur dioxide to complete the disinfection process. A second portion of the wastewater proceeds toward static mixer 27 through clarifier feed conduit 4. Static mixer 27 is discussed in more detail below.

High pH Disinfection

Downstream of branch point 2A but upstream of static mixer 27, the wastewater is injected with an alkaline solution such to raise its pH above neutral and to disinfect it of organisms that may thrive on low pH but for which high pH is lethal. The alkaline injection system comprises alkaline storage tank 61 from which alkaline forwarding pump 63 feeds the chemical through alkaline feed conduit 17 to the alkaline injection point just downstream of branch pont 2A. Preferably, the alkaline solution is a strong hydroxide compound such as lime (calcium hydroxide ($Ca(OH)_2$), sodium hydroxide (NaOH) or potassium hydroxide (KOH), depending on the wastewater to be treated. One having ordinary skill in the art will recognize that any suitable base solution may be chosen to elevate the pH of the wastewater without departing from the spirit and scope of the present invention.

Flocculent Injection

Downstream of the alkaline injection point but still upstream of static mixer 27, the wastewater is injected with a flocculent to promote clumping and precipitation of solid particles within the clarifier stage. The flocculent injection system comprises flocculent storage tank 56 from which flocculent forwarding pump 58 feeds the chemical through flocculent conduit 16 to the injection point into the wastewater stream just upstream of static mixer 27.

Different wastewater compositions require different flocculent treatments. Municipal waste, though surprisingly consistent, even including septic systems such as portable toilets which contain high concentrations of biocides, is high in organic compounds and microorganisms that feed upon them. Agricultural waste also can be high in bio-organisms but also includes high concentrations of nitrates and nitrites from fertilizer runoff. Industrial waste can vary radically, but often contains both bioorganisms and nitrates. All three may require different flocculent compounds.

Metal based flocculents such as iron compounds readily attract such particles and cause them to clump for better precipitation and removal as sludge Preferably, for the typical municipal wastewater influent, the flocculent is a liquid, iron-based, inorganic chemical such as ferric chloride (FeCL), ferrous sulfate ($FeSO_4$) or aluminum sulfate ($AlSO_4$), depending on the wastewater being treated.

Polymer Injection

Also provided for injection just upstream of static mixer 27 as needed, based upon the actual wastewater being treated, is a high pH tolerant polymer. Polymers can assist in the clumping process triggered by the flocculents, and can deter sticking of sludge to side walls of the clarifier stage, discussed in more detail below. A polymer injection system comprises polymer storage tank 66 from which polymer forwarding pump 68 feeds the chemical through polymer feed conduit 18 to be injected into the wastewater stream immediately upstream of static mixer 27.

Differing types of influent wastewater may require use of different types of polymers. The correct polymer for each application is determined by testing the influent wastewater. Some polymers that may be used with the system include, but are not limited to: CAT FLOC, CAT FLOC+HI, CAT FLOC+LO, CAT CO HI, AN FLOC HI, AN FLOC MED, and AN CO. All are manufactured and distributed by PFP Technology of Houston, Tex.

Static Mixer

Static mixer 27 comprises a small, one (1 ft.) foot diameter tank for mixing the chemicals injected into the wastewater just upstream thereof. As a static device, it is preferable to blenders and impellers which may clog and break down over time. As the wastewater enters static mixer 27, the device buffers and creates turbulence in the wastewater flow, causing the injected chemicals to become thoroughly mixed. Static mixer 27 contains no moving parts, and accomplishes the mixing by directing the flow tangentially into and out of a small tank. The tangential entry and exit causes the solution to move in a circular motion inside the small tank, thereby causing the necessary turbulence for mixing. The wastewater then exits static mixer 27, and proceeds via clarifier feed conduit 4 to reaction vessel 28, where solids are removed.

Solids Precipitation and Removal

As best seen in FIGS. 2-4B, clarifier, or reaction vessel, 28 comprises an inverted, cone-shaped chamber having a cylindrical top section where disinfected liquid water accumulates awaiting filtering. Wastewater enters at reaction vessel 28's lowest point 82 (FIGS. 2-3) and flows radially upwards in a swirling, rotating path to exit through header 85 disposed at the top of the cylindrical tank portion of reaction vessel 28. The significance of this flow pattern is discussed in more detail herein below.

Reaction vessel 28 is designed so that wastewater enters reaction vessel 28 on a tangent at the bottom through injection port 82. This causes the wastewater to flow in a circular motion (counter-clockwise in the northern hemisphere and clockwise in the southern hemisphere) while rising upwards through the vessel. This unique arrangement aids in the settling of the solids by using the effect of gravity in combination with the radially outward centrifugal force imparted by the circular motion.

Cone-shaped lower portion of reaction vessel 28 has walls that slope on an angle no greater than 29 degrees from vertical. At such slope, clumps of flocculated, suspended solid materials are prevented by gravity from sticking to the interior faces of reaction vessel 28. This aids in the settling of the solids, and results in a floating blanket of sludge (not shown) disposed in the lower third of reaction vessel 28. This blanket of sludge is maintained at a thickness of three to four feet by periodically removing sludge from reaction vessel 28 through sludge exit valve 41 and sludge conduit 12 to sludge storage tank 42. The sludge processing system is described in more detail below.

Headers

At the top of reaction vessel 28, header means for siphoning off the disinfected and de-flocculated wastewater directs it toward finishing filters 35, 36. The header means allows sufficient fluid to pass out of clarifier 28 so that there is no pressure differential created. The header means allows for collection of the liquid across the entire upper surface of reaction vessel 28, thereby promoting smooth, laminar flow toward filters 35, 36, which are discussed in more detail below.

Figure 4B:
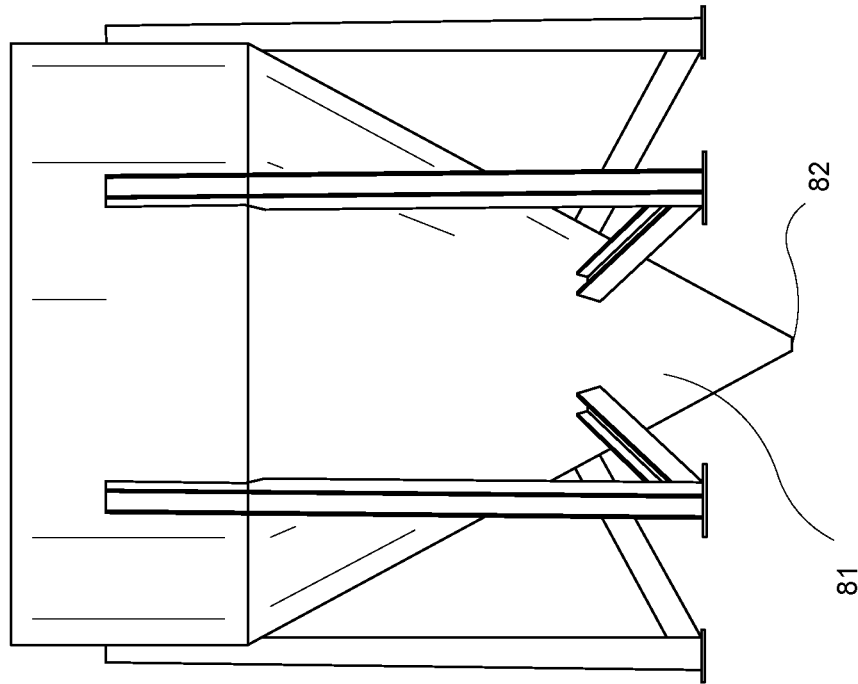
FIGS. 4A-4B depict perspective and front elevational views, respectively, of the reaction vessel of FIG. 2.
Figure 4A:
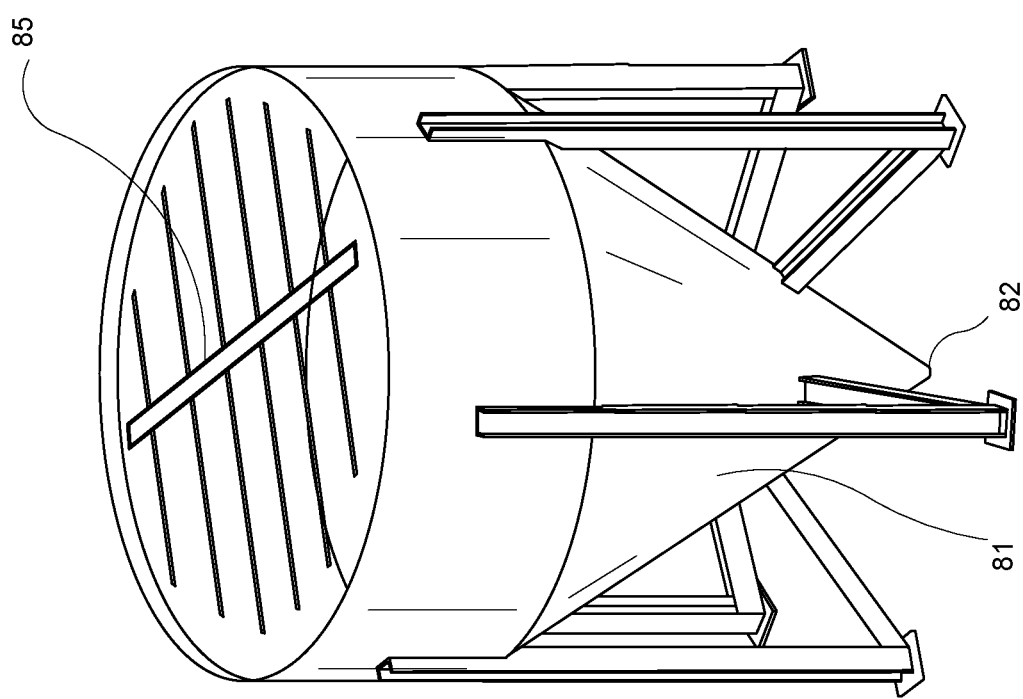
Figure 5B:
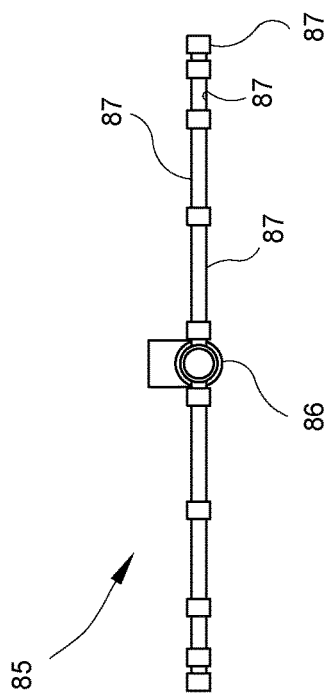
FIGS. 5A-7 details alternate embodiments of the header shown in FIG. 4A.
Figure 5C:
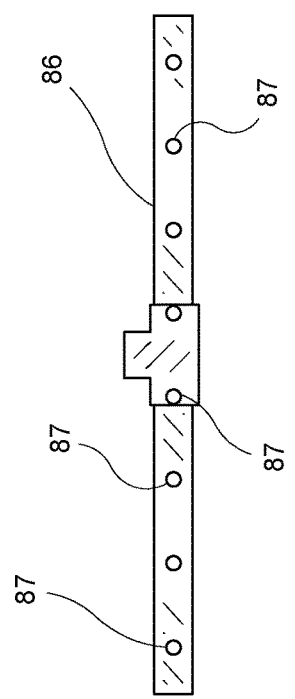
Figure 5A:
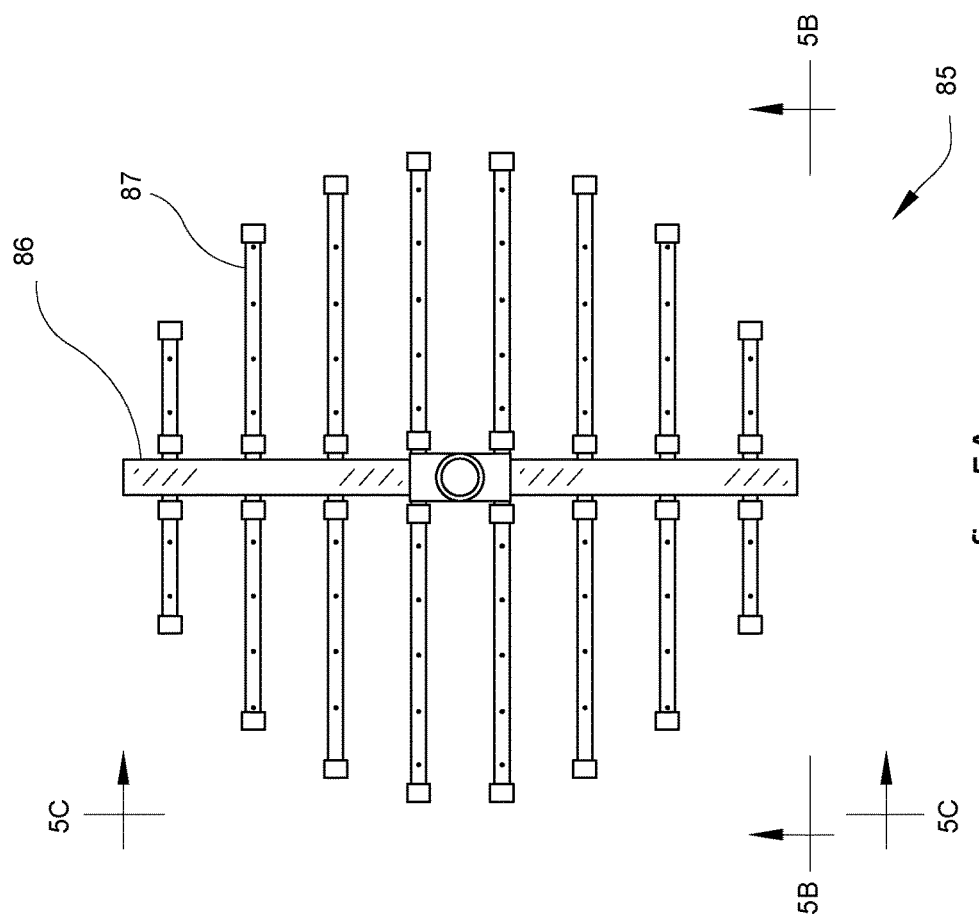
Figure 7:
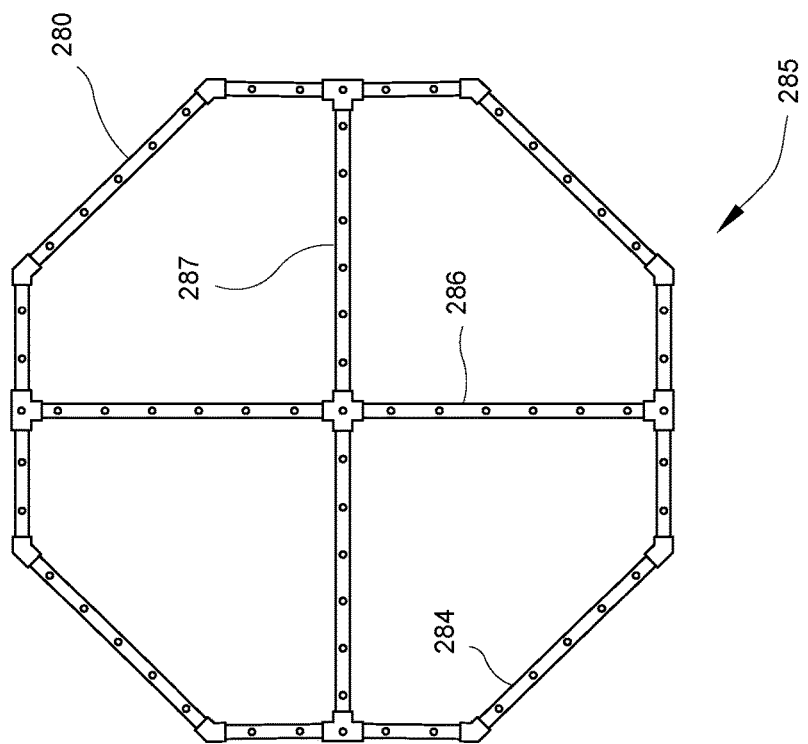
Figure 6A:
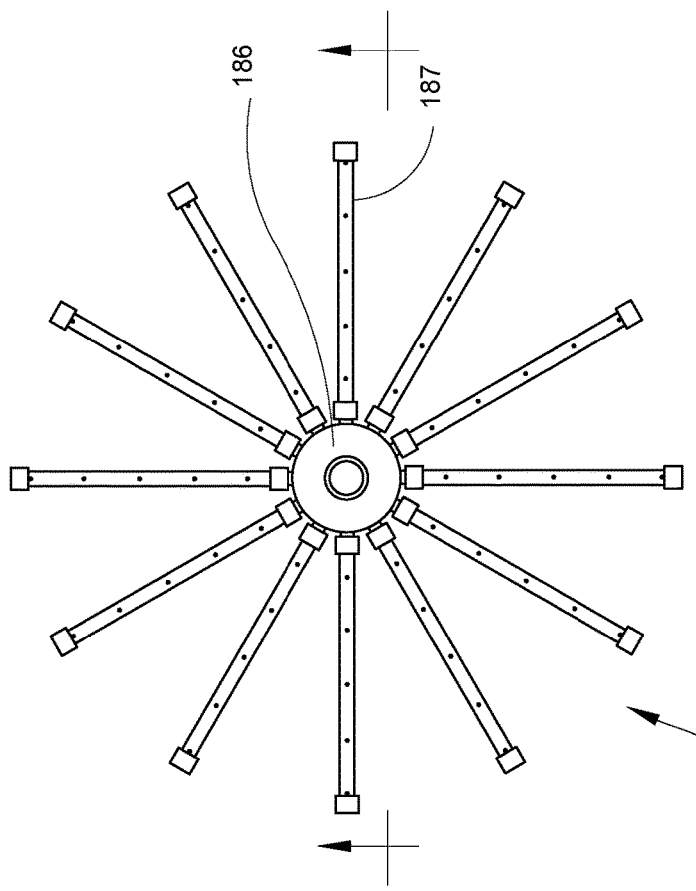
Figure 6B:
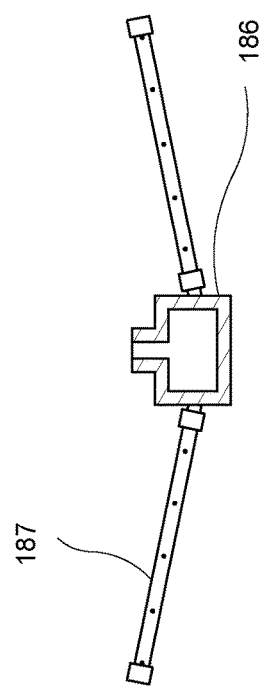

In a preferred embodiment, the header means comprises header 85 depicted in FIG. 4A. Header 85 is a tree-like, lateral structure having a central manifold 86 with parallel collector arms 87 disposed parallel to and spanning the water's surface in the top of reaction vessel 28. See FIGS. 5A-5C. Alternate embodiments to header 85 for the header means include hub radial design 185 (FIGS. 6A-6B) and upper collector design 285 (FIG. 7). One having ordinary skill in the art will recognize that all variations of header design are considered to be within the spirit and scope of the present invention.

The disinfected wastewater exits reaction vessel 28 through water conduit 5 and proceeds to stilling well 30. Stilling well 30 comprises a simple, columnar accumulator that reduces turbulence and flow, thereby allowing additional time for any remaining, minute, unsettled particles to settle out of suspension. The wastewater then exits stilling well 30 via conduits 6, 7A where it is re-pressurized by pressurizing pump 33 to a conduit pressure of between 40 and 60 PSI (pounds per square inch).

Finishing Filtering

From pump 33, the wastewater enters depth filter 35, a conventional multi-media filter utilizing filter media consisting of alternating layers of sand, garnet and anthracite. As the wastewater travels in a downward path through depth filter 35, it removes any remaining particles larger than approximately 15 to 20 microns. As the removed particles accrete in the filter, occasional backwashing is required. This is accomplished using water from the finished water storage tank 37, utilizing backwash conduit 10, and pressurizing pump 33.

As the disinfected, filtered wastewater exits depth filter 35, it may still retain residual amounts of sulfur dioxide. Sulfur dioxide itself deodorizes the wastewater stream, but it has its own odor which might be noticeable in the discharged water effluent. So, the wastewater is directed via filter conduit 8A to finishing filter 36. Finishing filter 36 is a conventional carbon filter utilizing granular active carbon media. As the disinfected, filtered wastewater travels in a downward path through finishing filter 36, any residual color and odor that may be present (though unlikely) is removed.

For both pressure filters 35, 36, an underdrain system allows sufficient liquid to pass out of the filters while maintaining a differential pressure of between 0.5 psi to 3 psi. This creates a back pressure in filters 35, 36 which keeps the liquid flowing evenly and throughout the square area of the vessel.

The wastewater treatment system of the present invention controls the disinfection process by automatically regulating the amount of $H_2SO_3$ (sulfurous acid), or $SO_2$ (sulfur dioxide), based on the output of a residual sulfite analyzer (not shown). The analyzer is positioned at the output of the finishing filters and provides a feedback loop to the system's control modules, discussed below. A suitable residual sulfite analyzer would be Model number A15/66-2-1, manufactured by Analytical Technology Incorporated.

From finishing filter 36, the disinfected, filtered wastewater is transported via finished water conduit 9 to finished water storage tank 37. From finished water storage tank 37, the treated wastewater can be discharged to the desired reuse via discharge pump 38 and discharge conduit 11, though some of it periodically will be utilized for filter backwashing via backwash conduit 10, as discussed herein above. The finished water can be used directly for irrigation, discharged into a waterway, or further processed for drinking water.

Sludge Storage and Processing

The sludge storage system receives settled particulates, or sludge, from reaction vessel 28 via sludge exit valve 41 and sludge conduit 12. The sludge storage section consists of sludge storage tank 42 and sludge mixer 43. Sludge mixer 43 keeps particulates in the sludge in suspension pending processing through filter press 48.

The sludge exits sludge storage tank 42 via air operated diaphragm pump 44 and is directed to sludge tank 42. The sludge then is pumped through filter press conduit 13 and into filter press 48 for de-watering. Filter press 48 accumulates sludge and compresses it, extracting liquid material from the sludge and returning it to influent surge tank 7 through liquid return conduit 14. A suitable filter press 48 module for the purpose is available as Model FP00456-FP630G32L-22-7AXC, from M.W. Watermark, LLC, of Holland, Mich.

Once filter press 48 has been filled, the flow of sludge is halted and filter press 48 is allowed to drain for approximately 5 minutes. Filter press 48 is then opened, and the pressed solids are removed for drying and other processing for re-use. These solids may be used as soil amendments, additives for animal feed stock, or burned as fuel to generate heat or possibly electricity.

Power Consumption, Capacity and Controls

The above described wastewater system may be of various sizes, but for the transportability feature described below, it is limited in size to treating between 14,400 gallons and 57,600 gallons of wastewater during a 24 hour period. This is ample for most temporary applications, and can serve a municipal system with hundreds of typical houses connected. If larger volumes are required, multiple units can be staged in parallel in sufficient numbers to handle the required flow.

In this preferred size embodiment, power consumption requires only a 240 volt supply, either single phase or three phase, with a capacity of fifteen (15 kw) kilowatts or less.

FIGS. 11A-11H depict screen prints of various control modules for an operator to control the wastewater treatment of the present invention. In a preferred embodiment, images on FIGS. 11A-11F represent real-time control buttons for operating the depicted equipment.

Transportability

Turning now also to FIGS. 8A-10, the portable wastewater treatment system of the present invention is shown completely contained on two elongate trailers 100, 200 adapted to be towed by tractor 91 along on national and local highways from one site to another. The entire system remains on trailers 100, 200 and operates without having first to be assembled nor disassembled for transportation. To achieve this remarkable feat, careful arrangement of the various pieces of equipment discussed individually herein above must be performed.

Trailer 100 comprises elongate deck 101 surrounded by side rails 105 and having a longitudinal axis extending between front tongue 103 and rear truck 110. Truck 110 comprises a transverse axle coupled to trailer 100 by conventional means and fitted with dual wheels and tires of proper size and strength to support the weight of trailer 100 with all the equipment installed onto deck 101. Tongue 103 includes conventional towing hitch equipment (not shown) adapted to mate with tractor 91's "fifth wheel" trailer rigging for safe transportation on highways. As best seen in FIG. 8A, when trailer 100 is in transportation mode, to be towed by tractor 91, tongue 103 is elevated above the rear wheels of tractor 91 with trailer 100's rear wheels engaging the ground 93.

Figure 8B:
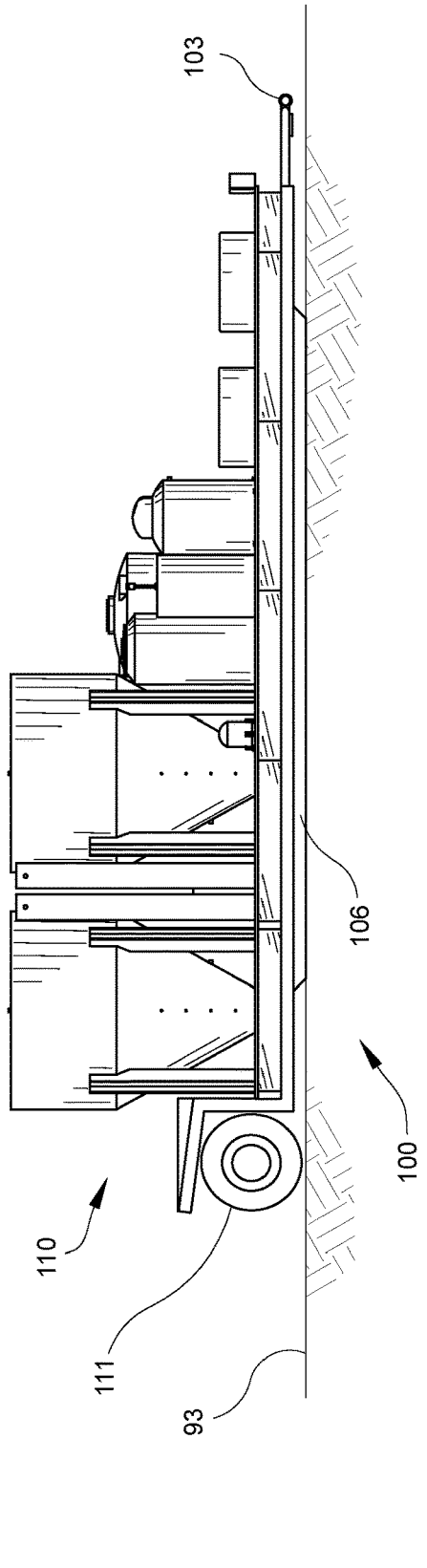
FIGS. 8A-8B show a physical layout of a portable version of the wastewater treatment system of FIG. 1.
Figure 8A:
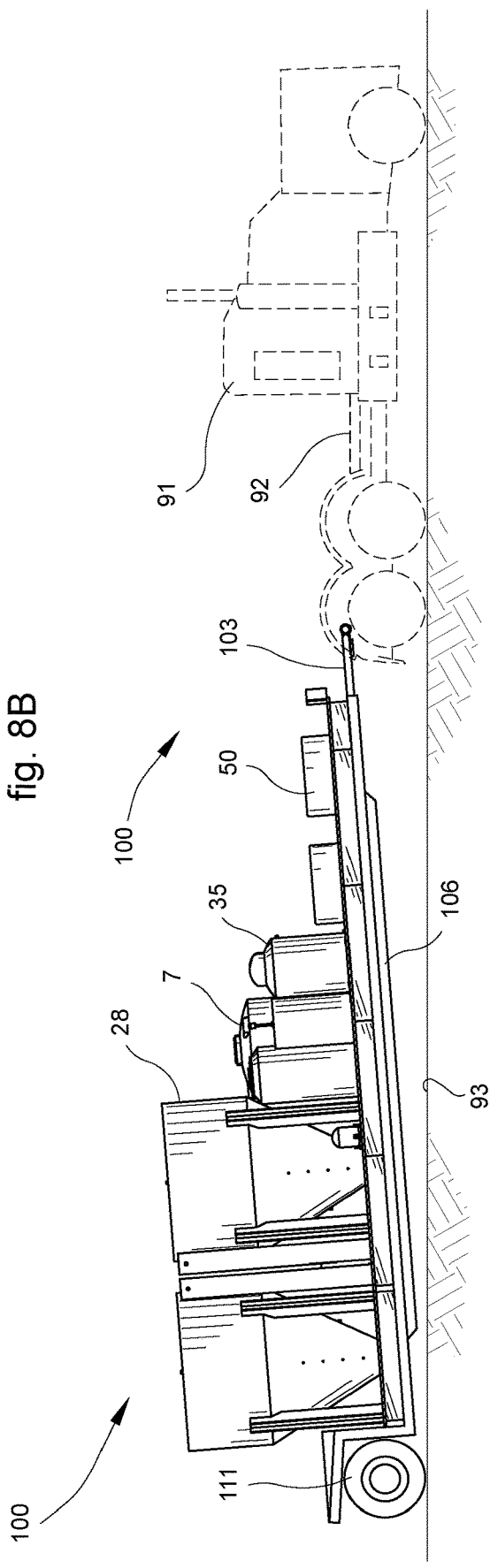

As best seen in FIG. 8B, when trailer 100 is installed and prepared for operation of the waste treatment system of the present invention, tongue 103 is in a much lower position than shown in FIG. 8A, and base rails 106 engage ground 93 to support trailer 100. Wheels 111 of truck 110 are lifted off of ground 93 and no longer bear the weight of trailer 100. One having ordinary skill in the art will recognize, of course, that ground 93 preferably comprises a level concrete pad at least the length and width of trailer 100 so that the waste treatment system of the present invention is leveled and stabilized against shifting soil conditions. Given the known weight of the waste treatment system and its equipment, chemical and sewage water loads, such a slab preferably is at least twelve (12 in.) inches thick and reinforced with sufficient steel reinforcing rods to withstand moment forces tending to bend and crack it.

Figure 9:
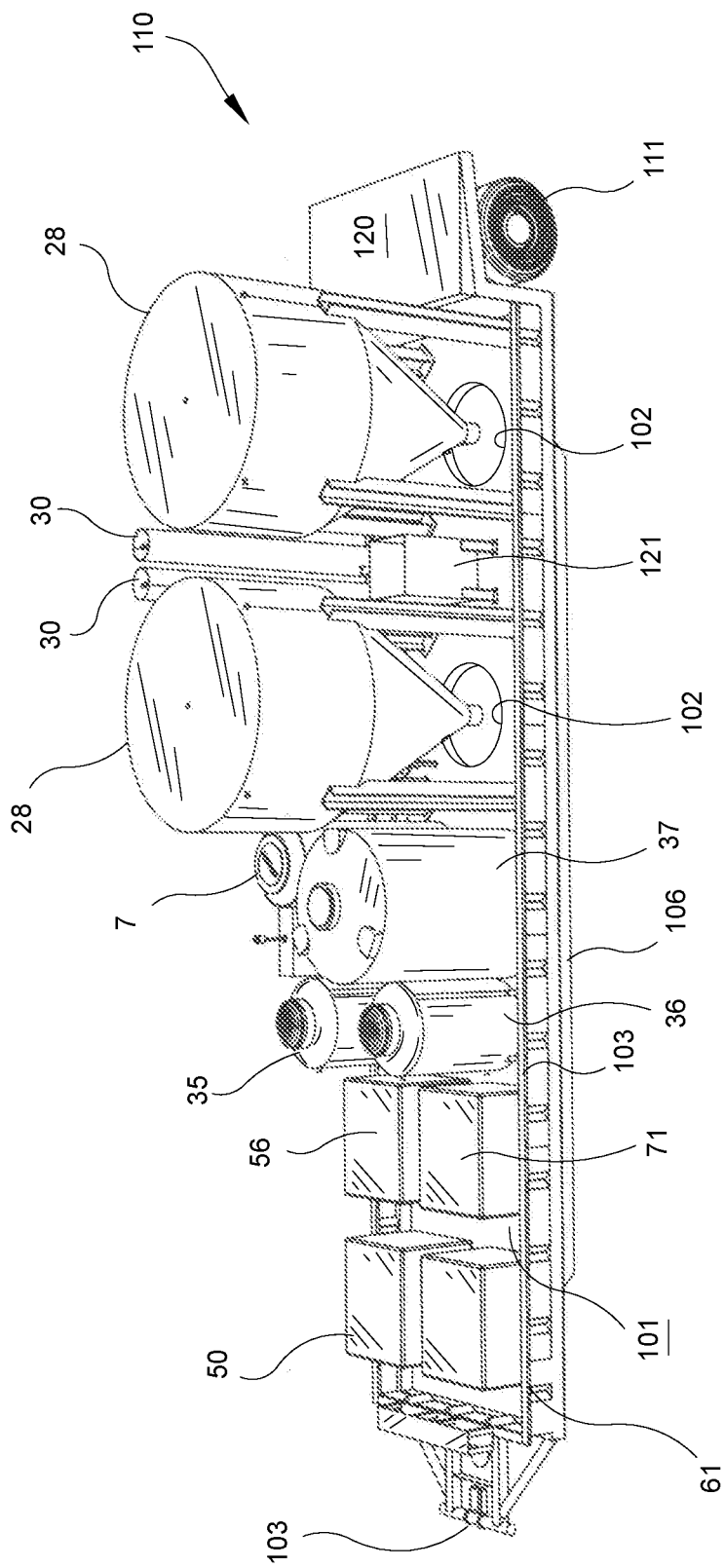
FIG. 9 depicts elevated side perspective view the reactor vessel trailer of the wastewater treatment system of FIGS. 1 and 8B.

As best seen in FIG. 9, the heaviest equipment borne by trailer 100 is reaction vessels 28, which are disposed at the rear of deck 101 nearest to truck 110. Reaction vessels 28 also are the largest components, and stand the tallest of all the equipment on trailer 100. By placing them at the rear of trailer 100, nearest truck 100, they must move the least amount in the vertical direction when tongue 103 is lifted onto tractor 91 for towing. Further, by lifting reaction vessels 28 the least necessary for roadway clearance under base rails 106, the lowest height of trailer 100 in transportation mode is achieved. This can be vitally important when trailer 100 must pass under low clearances like roadway underpasses or the like. If necessary, well 102 may be provided as a recess for the bottom of reaction vessels 28 to extend below deck 101 to achieve low enough clearance for transporting trailer 100 on national and local highways with the least amount of regulatory licensing and oversight. Wells 102 can be as deep as the height of base rails 106.

Disposed on deck 101 approximately at the longitudinal middle of trailer 100 and immediately forward of reaction vessels 28, influent surge tank 7 represents the entry point to trailer 100 of influent wastewater, as discussed herein above in conjunction with FIG. 1. Immediately forward of influent surge tank 7 are filters 35, 36 which are the last stage of treatment of disinfected and flocculated water before it is discharged from the system through finished water storage tank 37, also disposed immediately forward of reaction vessels 28. The lightest and most easily lifted equipment on trailer 100 are chemical tanks 50, 56, 61, 71 containing the acid, alkali, flocculant and polymer additives introduced into the wastewater stream as discussed above. Conveniently disposed between reaction vessels 28, sludge storage tank 42 is positioned to collect sludge from both vessels 28. Filter press 48 (not shown) may be installed atop truck deck 120 rearward from reaction vessels 28 and above truck 110.

One having ordinary skill in the art will recognize that appropriate piping, conduits and valves (not shown) are required to be in place to interconnect the equipment into the sequence of stages discussed herein above in conjunction with FIG. 1. Such piping, conduits and valves are contained completely within the confines of rails 105 surrounding deck 101.

Figure 10:
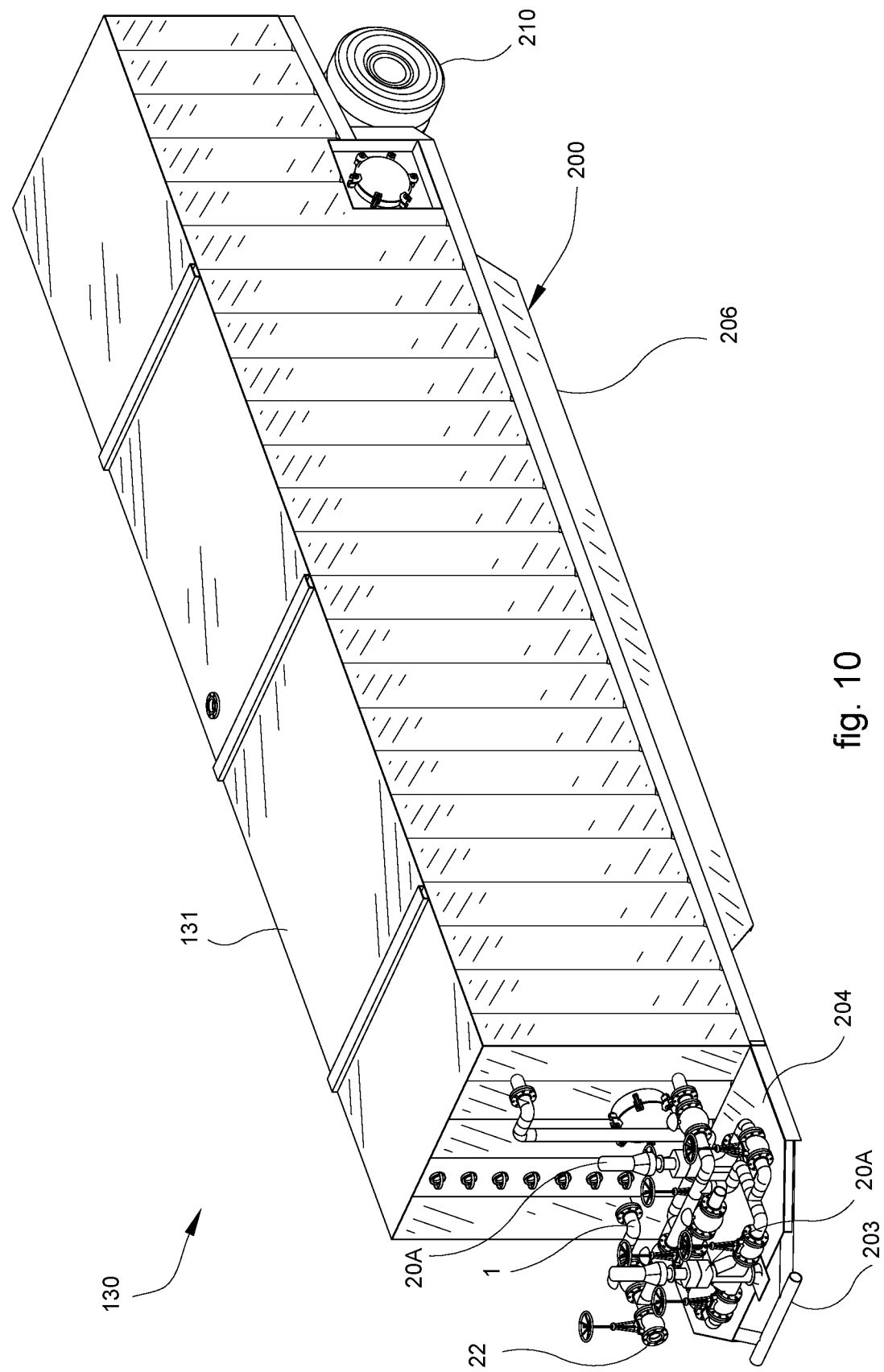
FIG. 10 shows the pretreatment vessel trailer of the treatment system of FIG. 1.
Figure 11A:
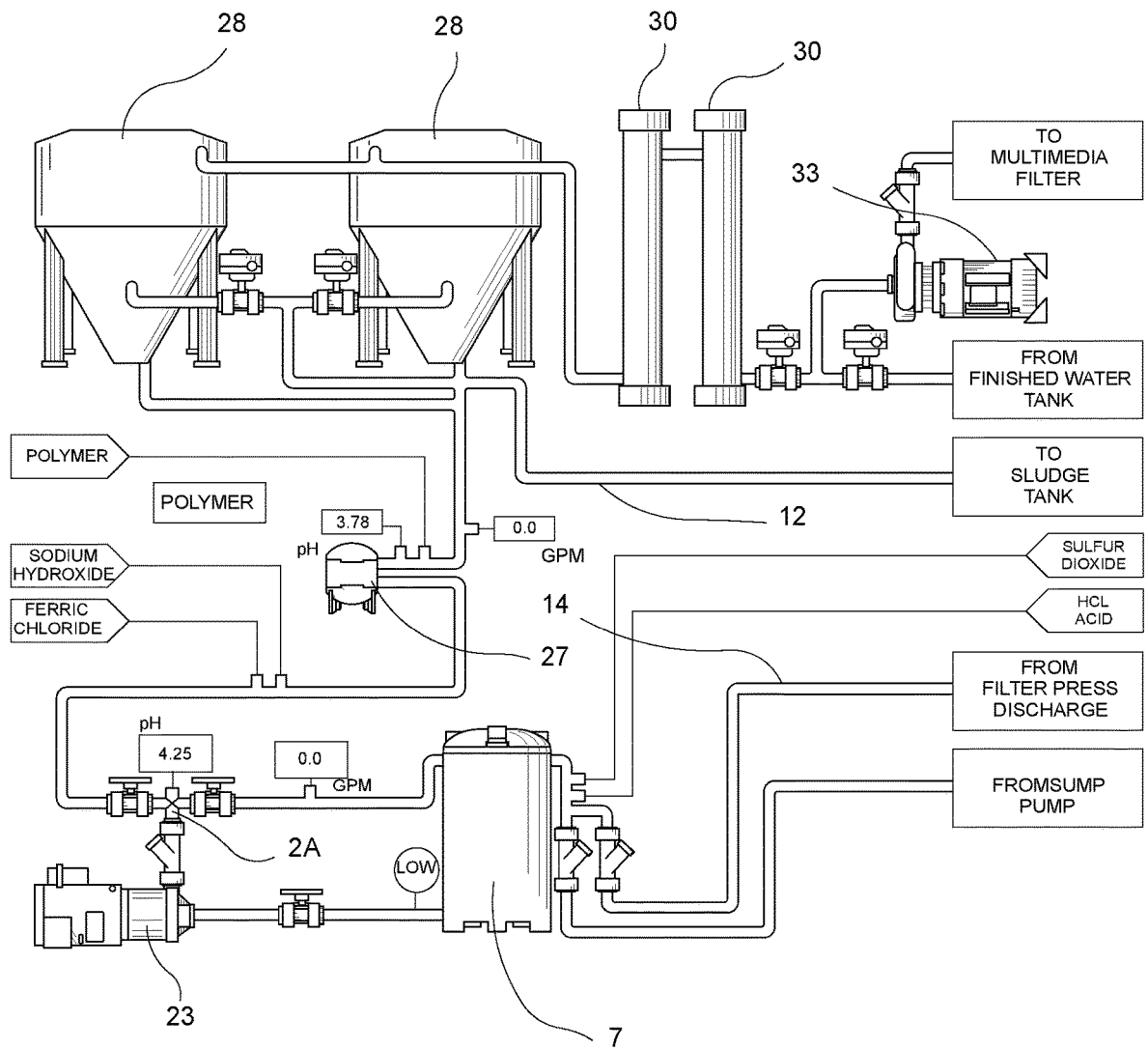
FIGS. 11A-11H depict displays for the control module for the system of FIG. 1.
Figure 11B:
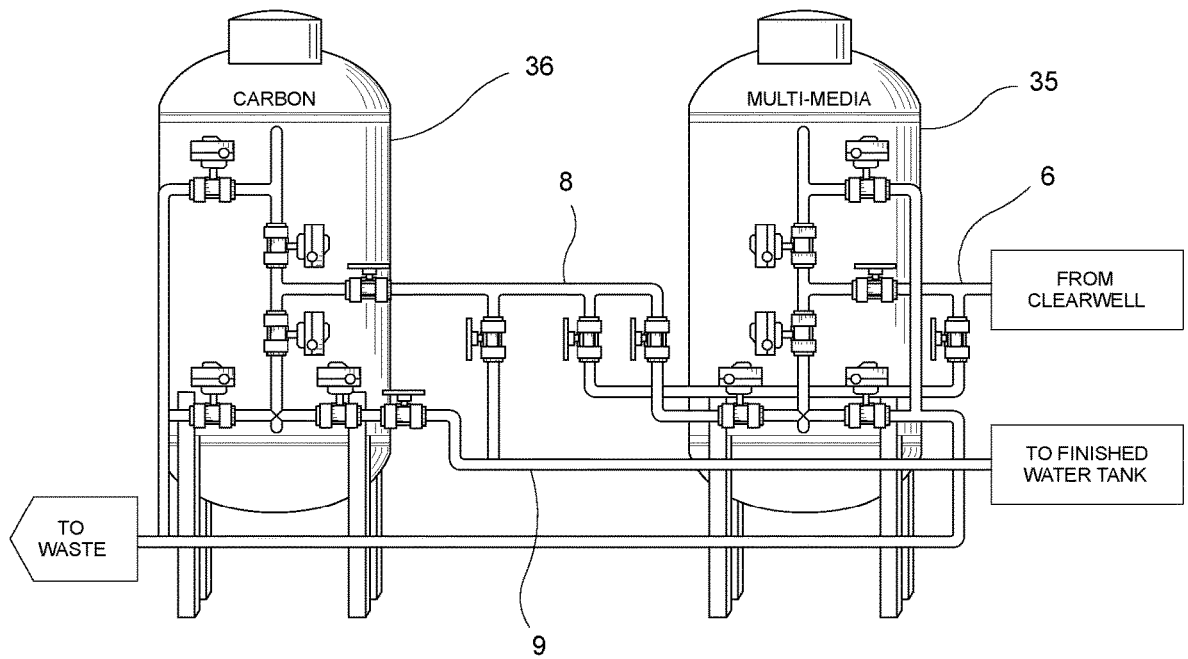
Figure 11C:
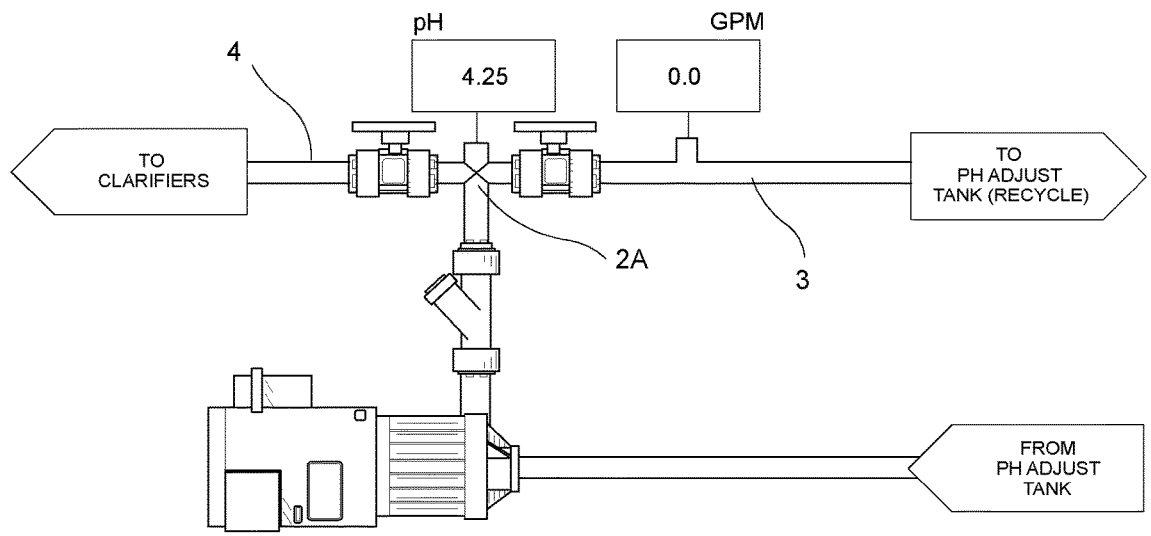
Figure 11D:
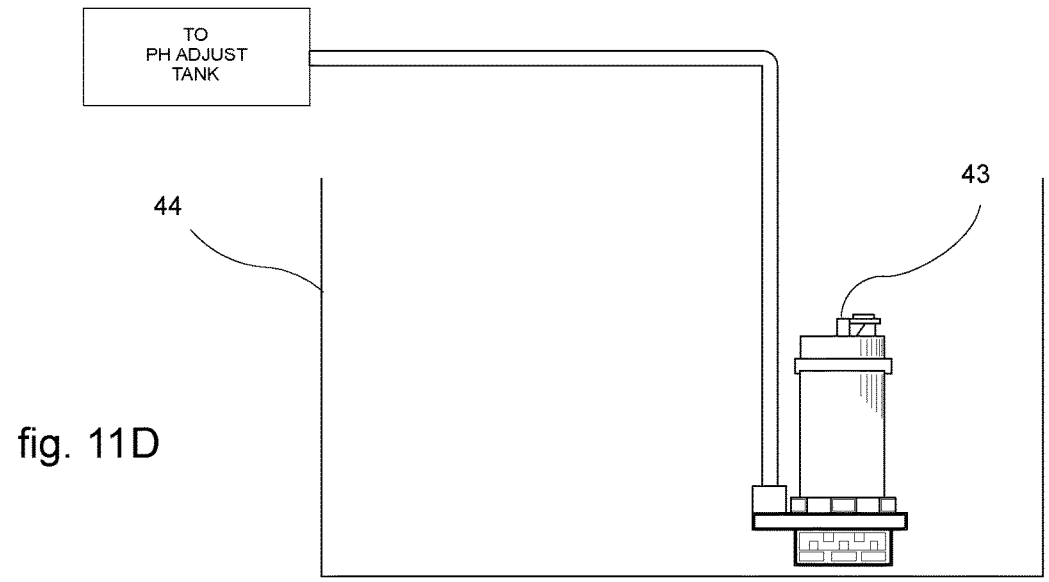
Figure 11E:
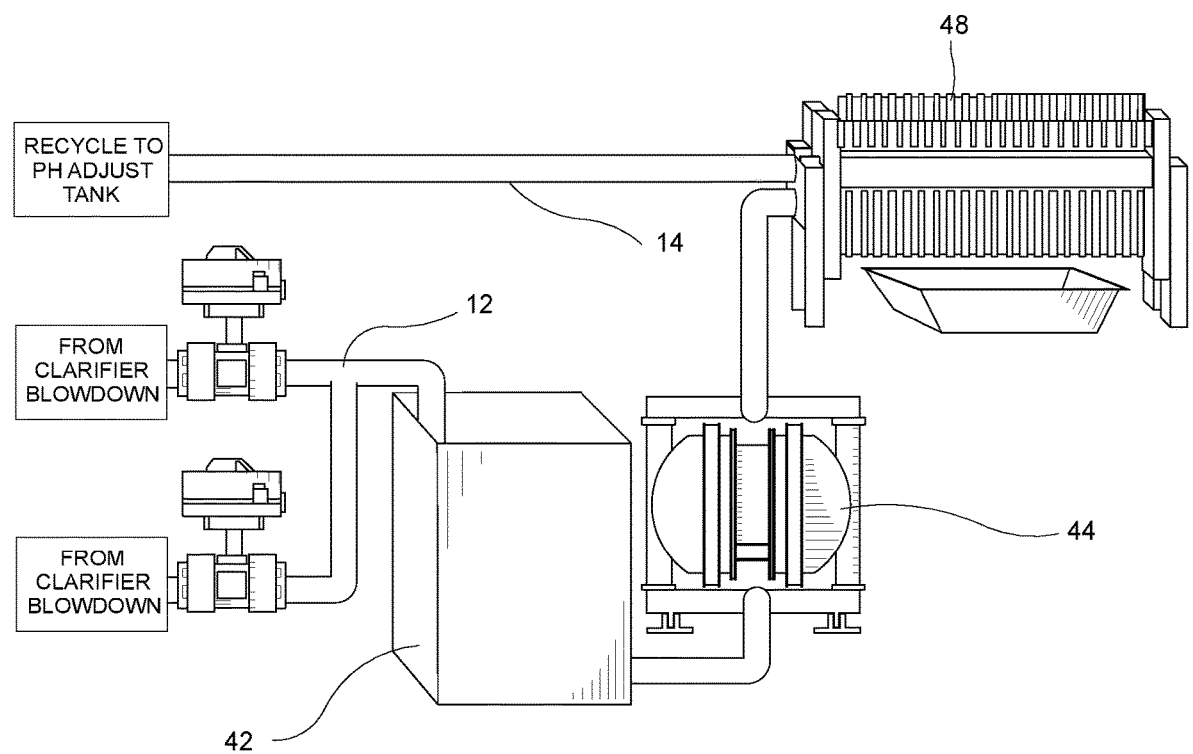
Figure 11F:
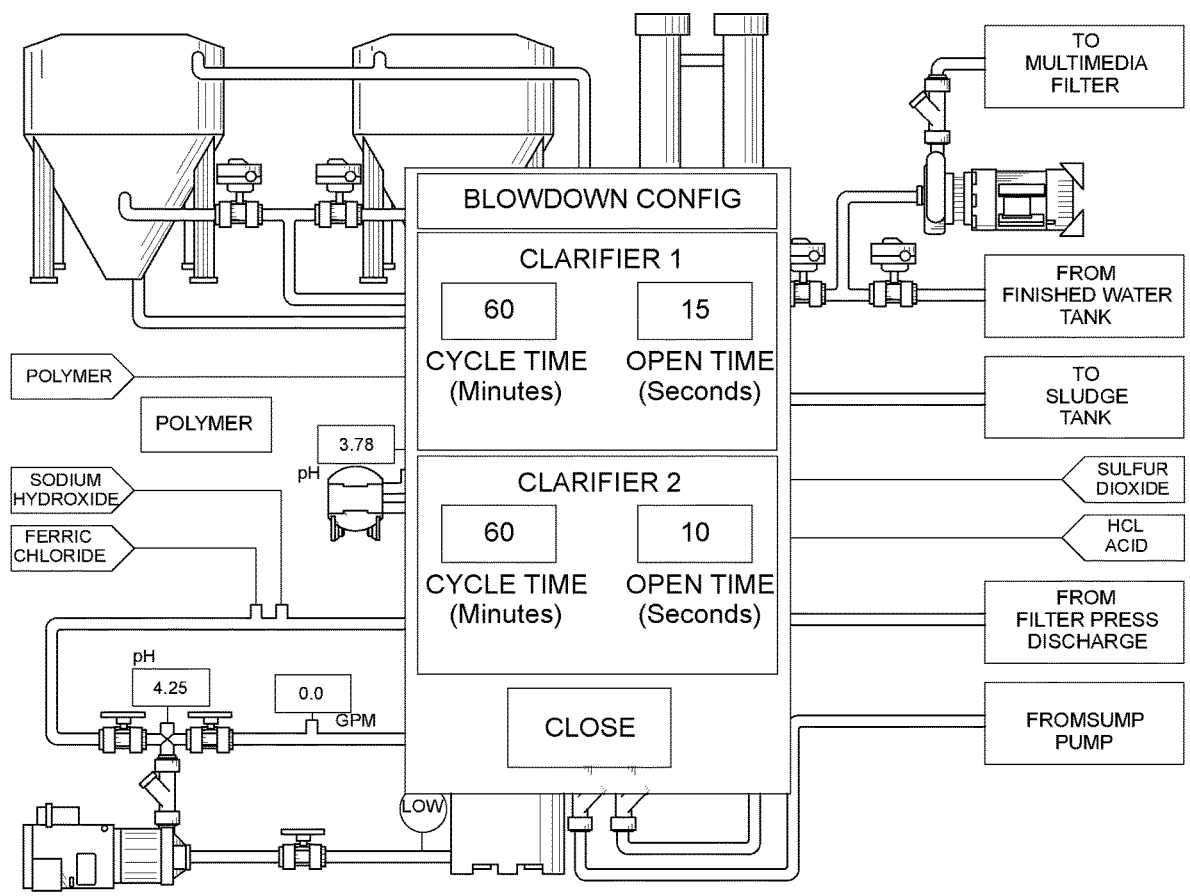
Figure 11G:
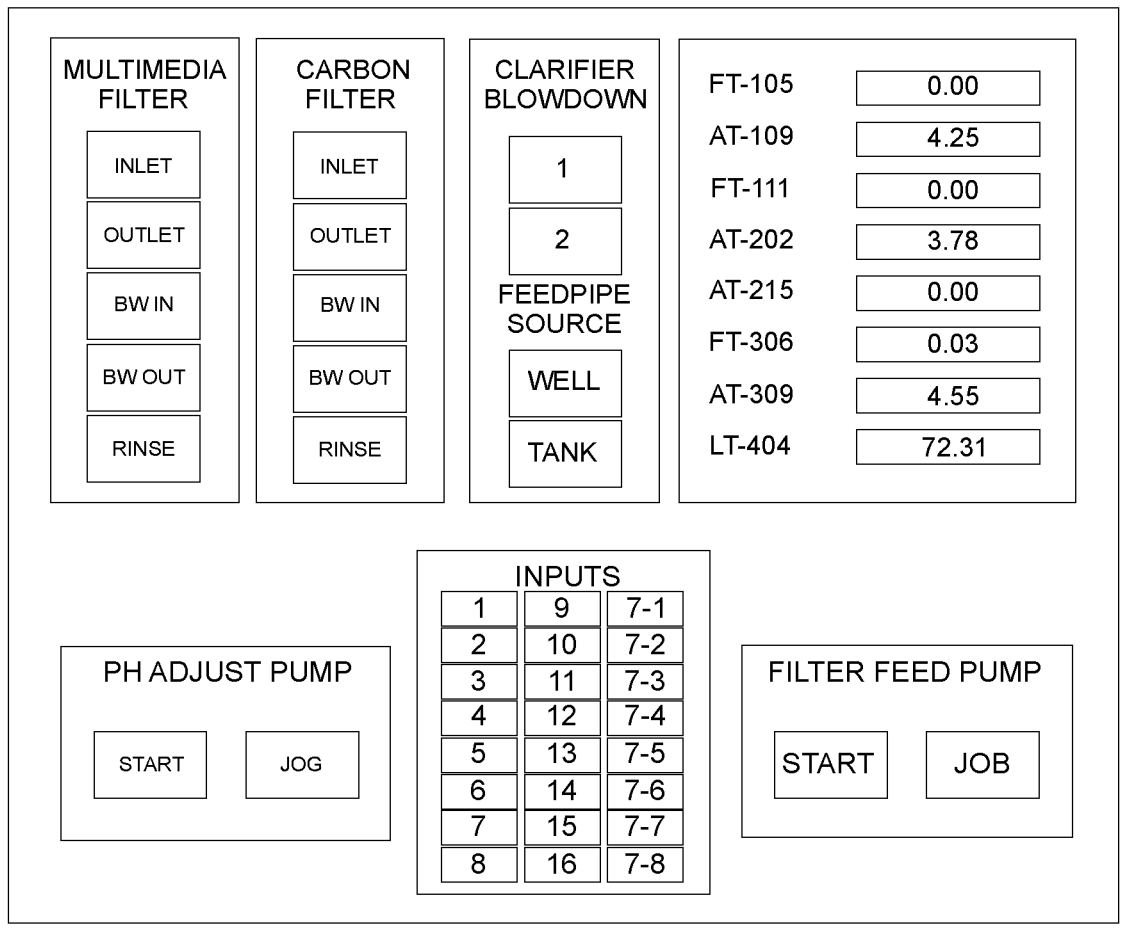
Figure 11H:
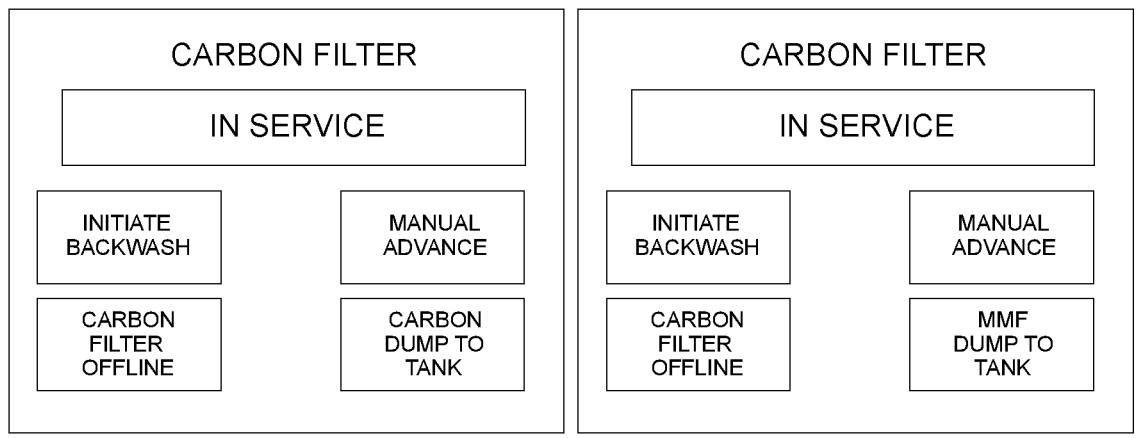

Turning now also to FIG. 10, pretreatment reservoir 130 is disposed on second trailer 200 and adapted to be towed by its tongue 203, supported by its truck 210, and installed on a second concrete slab 93 as discussed above for the wastewater treatment system of the present invention. Pretreatment reservoir 130 comprises a large, water- and sewer gas-tight tank 131 adapted to receive raw sewage from municipal sanitary sewer systems, septic tank trucks and other sources of wastewater intended to be processed by the present invention. Pretreatment reservoir 130 also provides a buffering system whereby a steady flow of influent wastewater is fed into influent surge tank 7, keeping the wastewater treatment system of the present invention operating smoothly and at maximum capacity despite potentially erratic arrival of raw sewage, especially from septic truck arrivals.

The incoming wastewater first passes through a grinder (not shown) to reduce the size of the solids to particles in the range of 200 microns (nominal). When tank 130 is loaded with wastewater being stored in anticipation of treatment, the wastewater is continuously circulated through the grinder using a pair of booster pumps 20A operating in parallel. As the wastewater recirculates into tank 131, it passes through a pair of educator/mixers which cause enough turbulence in tank 131 to keep solids in the wastewater suspended in solution. As illustrated in FIG. 10, tongue deck 204 provides a platform for the above equipment, including macerating pump 20 and other devices adapted to carry out such preparatory work, so that it need not be housed on wastewater treatment system trailer 100. Valve 22 couples to conduit 1 to feed wastewater from pretreatment reservoir 130 into influent surge tank 7 located on trailer 100.

A suitable grinder for the above describe application is the "Muffin Monster" model 30004T-1204-DI, available from JWC Environmental of Costa Mesa, Calif., USA. The grinder must be supplied with a compatible "Rock Trap" to prevent very dense material such as rocks, bolts, nuts, etc. from reaching the grinder. Suitable pumps for the above described pretreatment application are available as Model AC8SJS1V800B012104 from Finish Thompson, Inc., of Erie, Pa., USA. Suitable valves for the pretreatment system can be manually or automatically actuated, stainless steel butterfly valves available as Model 4-396-967-000 from ABZ, Inc., of Chantilly, Va., USA. Suitable check valves required in the above pretreatment system are available as Center Line Valve Company Model 04R1644D1X from MCC HOLDINGS, Inc., of Stamford, Conn., USA.

Fully loaded with the wastewater treatment system described above and depicted in FIG. 8A, trailer 100 weighs approximately 25,000 pounds. Trailer 100 preferably is approximately eight and one-half (8½ ft.) feet wide, forty-five (45 ft.) feet long, and with the equipment depicted in FIG. 8A aboard, no more than thirteen and one-half (13½ ft.) feet high. Trailer 200, though having substantially the same horizontal dimensions, need not be nearly as tall, preferably being approximately ten (10 ft.) high.

Thus, trailers 100, 200 as depicted and described are sufficiently small and light weight that the entire system can travel on the highways and local roads of most if not all states of the United States without obtaining wide-load and heavy equipment permits and without escorts and clearance supervision for overpasses, bridges and the like. This makes the present invention readily transportable from one site to another with only the cost and time required to connect and disconnect it and to travel between sites.

While the invention has been particularly shown and described with reference to preferred and alternate embodiments, it will be understood by those skilled in the art that various changes in form and detail may be made therein without departing from the spirit and scope of the invention.

We claim:
1. An improved method of non-biological treatment of untreated sewage water, the improved method comprising
providing a sewage treatment system having
  a sewage water intake having
    a reservoir adapted to accumulate influent sewage water from diverse sewage sources;
    a circulating pump adapted to create a sewage water stream circulating within said reservoir;
    a dense materials filter coupled downstream of said circulating pump within said sewage water stream;
    at least one grinder coupled downstream of said dense materials filter and adapted to grind solid materials of indeterminate size within said sewage water stream into solid material particles of substantially similar size;
    at least one macerating pump adapted to further reduce in size said solid material into particles of substantially similar size;
    a forwarding pump coupled downstream of said macerating pump and adapted to forward said sewage water stream within said portable sewage water treatment system; and
    a surge tank coupled downstream of said forwarding pump and adapted to equalize sewage water stream pressure within said portable sewage water treatment system;
  a clarifier coupled to said sewage water intake, said clarifier having
    a tank having
      a vertical axis extending between a top and a bottom;
      tank walls surrounding said vertical axis and defining a clarifier interior, said tank walls further defining
        a holding chamber disposed adjacent said top, said holding chamber having substantially vertical, cylindrical sides extending a spaced distance below said top; and
        a circulating chamber disposed below said holding chamber and extending to said bottom, said circulating chamber having substantially conical walls converging at a select angle relative to said vertical axis from adjacent said holding chamber to adjacent said bottom;
    a sewage water stream injection port coupled to said circulating chamber adjacent said bottom and in fluid communication with said clarifier interior; and
    header means disposed within said holding chamber and adapted to siphon a treated sewage water stream of treated sewage water from said clarifier;
  disinfecting means coupled between said sewage water intake and said clarifier for non-biologically disinfecting said sewage water;
  flocculation means coupled between said disinfectant means and said clarifier;
  polymer treatment means for introducing polymer into said sewage water;
  filtering means for filtering said treated sewage water;
  monitoring means for controlling said sewage water treatment system; then directing said untreated sewage water into said sewage water intake; then disinfecting said untreated sewage water using said disinfecting means; then
  operating said flocculation means to cause solid materials suspended in said sewage water to precipitate out of solution and to clump together; then introducing polymer from said polymer treatment means into said sewage water to discourage flocculated solid materials from sticking to said tank walls within said clarifier interior; then clarifying said sewage water using said clarifier to remove said solid materials from said sewage water by carrying out the steps of;

injecting said sewage water in a continuous sewage water stream into said sewage water stream injection port; then siphoning said treated sewage water in a continuous treated sewage water stream from said holding chamber using said header means; then directing said treated sewage water stream to said filtering means; then filtering said treated sewage water with said filtering means; then discharging said treated sewage water from said sewage treatment system.

2. The improved method of claim 1 wherein said disinfecting means includes acid injection means coupled downstream of said surge tank for injecting a select acid into said sewage water;

alkaline injection means coupled downstream of said acid injection means for injecting a select alkaline into said sewage water; and neutralizer injection means coupled to said downstream of said alkaline injection means for injecting a pH neutralizer into said sewage water; and said disinfecting step further comprises the steps of injecting a select quantity of acid into said sewage water using said acid injection means to lower a pH of said sewage water stream to a value less than 7.0;

injecting a select quantity of alkaline into said sewage water using said alkaline injection means to raise said pH of said sewage water stream to a value greater than 7.0; then injecting a select quantity of neutralizer into said sewage water to return said pH of said sewage water stream to a value substantially equal to 7.0.

3. The improved method of claim 1 and further comprising the steps of providing a sludge handling system having a sludge exit port disposed within said conical walls;

a sludge exit valve coupled to said exit port;

a sludge tank coupled to said sludge exit valve;

a sludge mixer coupled within said sludge tank; and a sludge filter press coupled to said sludge storage tank; then during the clarifying step periodically opening said sludge exit valve; then directing said solid materials into said sludge tank; then closing said sludge exit valve; and operating said sludge mixer and said sludge filter press to remove water from said sludge; then storing said sludge for use as fertilizer and fuel.

4. An improved method of non-biological treatment of sewage water, the improved method comprising providing a sewage treatment system having a sewage water intake having a reservoir adapted to accumulate influent sewage water from diverse sewage sources;

a circulating pump adapted to create a sewage water stream circulating within said reservoir;

a dense materials filter coupled downstream of said circulating pump within said sewage water stream;

at least one grinder coupled downstream of said dense materials filter and adapted to grind solid materials of indeterminate size within said sewage water stream into solid material particles of substantially similar size;

at least one macerating pump adapted to further reduce in size said solid material into particles of substantially similar size;

a forwarding pump coupled downstream of said macerating pump and adapted to forward said sewage water stream within said portable sewage water treatment system; and a surge tank coupled downstream of said forwarding pump and adapted to equalize sewage water stream pressure within said portable sewage water treatment system;

clarifier means coupled to said sewage water intake for clarifying said sewage water to become treated sewage water;

disinfecting means coupled between said sewage water intake and said clarifier means for non-biologically disinfecting said sewage water;

flocculation means coupled between said disinfectant means and said clarifier means;

polymer treatment means for introducing polymer into said sewage water;

filtering means for filtering said treated sewage water;

monitoring means for controlling said sewage water treatment system; then directing said sewage water into said sewage water intake; then disinfecting said sewage water using said disinfecting means; then operating said flocculation means to cause solid materials suspended in said sewage water to precipitate out of solution and to clump together; then introducing polymer from said polymer treatment means into said sewage water to discourage flocculated solid materials from sticking to said clarifier means; then directing said sewage water into said clarifier means; then clarifying said sewage water using said clarifier means to remove said solid materials from said sewage water; then filtering said treated sewage water with said filtering means; then discharging said treated sewage water from said sewage treatment system.

5. The improved method of claim 4 wherein said disinfecting means includes acid injection means coupled downstream of said surge tank for injecting a select acid into said sewage water;

alkaline injection means coupled downstream of said acid injection means for injecting a select alkaline into said sewage water; and neutralizer injection means coupled to said downstream of said alkaline injection means for injecting a pH neutralizer into said sewage water; and said disinfecting step further comprises the steps of injecting a select quantity of acid into said sewage water using said acid injection means to lower a pH of said sewage water stream to a value less than 7.0;

injecting a select quantity of alkaline into said sewage water using said alkaline injection means to raise said pH of said sewage water stream to a value greater than 7.0; and then injecting a select quantity of neutralizer into said sewage water to return said pH of said sewage water stream to a value substantially equal to 7.0.

6. The improved method of claim 5 wherein
said neutralizer injection means comprises a select one of said acid injection means and said alkaline injection means; and
said neutralizer is selected from a group comprising said acid and said alkalizer.

7. The improved method of claim 4 wherein
said clarifying means includes a tank having
 a vertical axis extending between a top and a bottom;
 tank walls surrounding said vertical axis and defining a clarifier interior, said tank walls further defining
  a holding chamber disposed adjacent said top, said holding chamber having substantially vertical, cylindrical sides extending a spaced distance below said top; and
  a circulating chamber disposed below said holding chamber and extending to said bottom, said circulating chamber having substantially conical walls converging at a select angle relative to said vertical axis from adjacent said holding chamber to adjacent said bottom;
a sewage water stream injection port coupled to said circulating chamber adjacent said bottom and in fluid communication with said clarifier interior; and
header means disposed within said holding chamber and adapted to siphon a treated sewage water stream of treated sewage water from said clarifier; and
said clarifying step further comprises the steps of
 injecting said sewage water in a continuous sewage water stream into said sewage water stream injection port; then
 siphoning said treated sewage water in a continuous treated sewage water stream from said holding chamber using said header means; then
 directing said treated sewage water stream to said filtering means.

8. The improved method of claim 7 and further comprising the steps of
providing a sludge handling system having
 a sludge exit port disposed within said conical walls;
 a sludge exit valve coupled to said exit port;
 a sludge tank coupled to said sludge exit valve;
 a sludge mixer coupled within said sludge tank; and
 a sludge filter press coupled to said sludge storage tank; then during the clarifying step
periodically opening said sludge exit valve; then
directing said solid materials into said sludge tank; then
closing said sludge exit valve; and
operating said sludge mixer and said sludge filter press to remove water from said sludge; then
storing said sludge for use as fertilizer and fuel.

9. An improved method of non-biological treatment of sewage water, the improved method comprising
providing a sewage treatment system having
a sewage water intake having
 a reservoir adapted to accumulate influent sewage water from diverse sewage sources;
 a circulating pump adapted to create a sewage water stream circulating within said reservoir;
 a dense materials filter coupled downstream of said circulating pump within said sewage water stream;
 at least one grinder coupled downstream of said dense materials filter and adapted to grind solid materials of indeterminate size within said sewage water stream into solid material particles of substantially similar size;
 at least one macerating pump adapted to further reduce in size said solid material into particles of substantially similar size;
 a forwarding pump coupled downstream of said macerating pump and adapted to forward said sewage water stream within said portable sewage water treatment system; and
 a surge tank coupled downstream of said forwarding pump and adapted to equalize sewage water stream pressure within said portable sewage water treatment system;
clarifier means coupled to said sewage water intake for clarifying said sewage water to become treated sewage water;
disinfecting means coupled between said sewage water intake and said clarifier means for non-biologically disinfecting said sewage water;
flocculation means coupled between said disinfectant means and said clarifier means;
polymer treatment means for introducing polymer into said sewage water;
filtering means for filtering said treated sewage water;
monitoring means for controlling said sewage water treatment system; and
a sludge handling system having
 a sludge exit port disposed within said clarifier means;
 a sludge exit valve coupled to said exit port;
 a sludge tank coupled to said sludge exit valve;
 a sludge mixer coupled within said sludge tank; and
 a sludge filter press coupled to said sludge storage tank; then
directing said sewage water into said sewage water intake; then
disinfecting said sewage water using said disinfecting means; then
operating said flocculation means to cause solid materials suspended in said sewage water to precipitate out of solution and to clump together; then
introducing polymer from said polymer treatment means into said sewage water to discourage flocculated solid materials from sticking to said clarifier means; then
directing said sewage water into said clarifier means; then
clarifying said sewage water using said clarifier means to remove said solid materials from said sewage water; then
filtering said treated sewage water with said filtering means; then
discharging said treated sewage water from said sewage treatment system; and
executing at select intervals of time the additional steps of
 opening said sludge exit valve; then
 directing said solid materials into said sludge tank; then
 closing said sludge exit valve; and
 operating said sludge mixer and said sludge filter press to remove water from said sludge; and then
 storing said sludge for use as fertilizer and fuel.

10. The improved method of claim 9 wherein
said disinfecting means includes
acid injection means coupled downstream of said surge tank for injecting a select acid into said sewage water;
alkaline injection means coupled downstream of said surge tank for injecting a select alkaline into said sewage water; and neutralizer injection means coupled to said downstream of said acid injection means and said alkaline injection means for injecting a pH neutralizer into said sewage water; and said disinfecting step further comprises the steps of injecting a select quantity of acid into said sewage water using said acid injection means to lower a pH of said sewage water stream to a value less than 7.0;

injecting a select quantity of alkaline into said sewage water using said alkaline injection means to raise said pH of said sewage water stream to a value greater than 7.0; and then injecting a select quantity of neutralizer into said sewage water to return said pH of said sewage water stream to a value substantially equal to 7.0.

11. The improved method of claim 10 wherein said neutralizer injection means comprises a select one of said acid injection means and said alkaline injection means; and said neutralizer is selected from a group comprising said acid and said alkalizer.

12. The improved method of claim 9 wherein said clarifying means includes a tank having a vertical axis extending between a top and a bottom;

tank walls surrounding said vertical axis and defining a clarifier interior, said tank walls further defining a holding chamber disposed adjacent said top, said holding chamber having substantially vertical, cylindrical sides extending a spaced distance below said top; and a circulating chamber disposed below said holding chamber and extending to said bottom, said circulating chamber having substantially conical walls converging at a select angle relative to said vertical axis from adjacent said holding chamber to adjacent said bottom;

a sewage water stream injection port coupled to said circulating chamber adjacent said bottom and in fluid communication with said clarifier interior; and header means disposed within said holding chamber and adapted to siphon a treated sewage water stream of treated sewage water from said clarifier; and said clarifying step further comprises the steps of injecting said sewage water in a continuous sewage water stream into said sewage water stream injection port; then siphoning said treated sewage water in a continuous treated sewage water stream from said holding chamber using said header means; then directing said treated sewage water stream to said filtering means.

\* \* \* \* \*